(12) United States Patent
Yamanaka et al.

(10) Patent No.: US 6,534,150 B1
(45) Date of Patent: Mar. 18, 2003

(54) STRETCHED FILM OF THERMOPLASTIC RESIN

(75) Inventors: Masaaki Yamanaka, Ibaraki (JP); Tokumi Chiba, Ibaraki (JP)

(73) Assignee: Oji-Yuka Synthetic Paper Co., Ltd., Tokyo (JP)

( * ) Notice: Subject to any disclaimer, the term of this patent is extended or adjusted under 35 U.S.C. 154(b) by 0 days.

(21) Appl. No.: 09/700,795

(22) PCT Filed: May 19, 1999

(86) PCT No.: PCT/JP99/02605

§ 371 (c)(1),
(2), (4) Date: Dec. 29, 2000

(87) PCT Pub. No.: WO99/59813

PCT Pub. Date: Nov. 25, 1999

(30) Foreign Application Priority Data

| May 20, 1998 | (JP) | .......................................... | 10-138480 |
| Jun. 4, 1998 | (JP) | .......................................... | 10-155561 |
| Jun. 4, 1998 | (JP) | .......................................... | 10-155562 |

(51) Int. Cl.[7] .............................. D06N 7/04; B32B 3/00; B32B 31/00; D02J 1/06
(52) U.S. Cl. ....................... 428/143; 428/172; 428/212; 428/312.2; 428/316.6; 264/210.1; 264/241; 264/288.8; 264/291; 156/229; 52/311.1
(58) Field of Search ............................... 428/156, 141, 428/143, 148, 149, 212, 218, 324, 327, 330, 331, 147, 150, 500, 521, 474.4, 480, 172, 312.2, 316.6; 156/229; 264/165, 239, 291, 293, 288.4, 167, 173.15, 210.1, 241, 288.8; 52/311.1

(56) References Cited

U.S. PATENT DOCUMENTS

| 4,318,950 A | * | 3/1982 | Takashi et al. .............. 428/143 |
| 4,472,227 A | * | 9/1984 | Toyoda et al. ......... 156/244.11 |
| 5,800,909 A | * | 9/1998 | Nitta et al. .................. 428/207 |

FOREIGN PATENT DOCUMENTS

| JP | 2-026739 | 1/1990 |
| JP | 6-238787 | 8/1994 |
| JP | 6-320695 | 11/1994 |
| JP | 9-295466 | 11/1997 |
| JP | 9-325717 | 12/1997 |
| JP | 10-182862 | 7/1998 |
| JP | 10-234991 | 9/1998 |
| JP | 11-138673 | 5/1999 |

* cited by examiner

*Primary Examiner*—Donald J. Loney
(74) *Attorney, Agent, or Firm*—Oblon, Spivak, McClelland, Maier & Neustadt, P.C.

(57) ABSTRACT

Disclosed is a stretched film of a thermoplastic resin comprising a stretched film base layer (A) containing 40 to 85 wt % of a thermoplastic resin and 60 to 15 wt % of an inorganic or organic fine powder; and a stretched film surface layer(B), being provided at least on one surface of said stretched film base layer (A), containing 30 to 90 wt % of a thermoplastic resin and 70 to 10 wt % of inorganic or organic fine powder having an average particle size smaller than that of the inorganic or organic fine powder contained in the stretched film base layer (A), and has a porosity of 5 to 60%. The stretched film of the thermoplastic resin has a high surface hardness, excellent processability in embossing and desirable ink adhesiveness, and can effectively be used in a variety of applications including building decorative.

17 Claims, No Drawings

STRETCHED FILM OF THERMOPLASTIC RESIN

FIELD OF THE INVENTION

The present invention relates to a stretched film of a thermoplastic resin having a high surface hardness, excellent processability in embossing and desirable ink adhesiveness, and to a method for producing such film. The stretched film of a thermoplastic resin of the present invention can effectively be used in a variety of applications including building decorative materials having micropores.

RELATED ART

Vinyl chloride-base resin, such as vinyl chloride resin or vinyl chloride-vinyl acetate copolymer resin, is known as a thermoplastic resin excellent in applicability to printing or processability in embossing. The vinyl chloride-base resin has a diversity of industrial uses by virtue of its simplicity in controlling the hardness with a plasticizer and its inexpensiveness. Vinyl chloride resin is also a major component of a resin film which is widely used as building decorative materials.

A problem, however, resides in the vinyl chloride resin in that it may generate hazardous gases such as chlorine gas and hydrogen chloride gas in the case of the waste treatment or fire disaster, and is thus causative of deterioration of incinerators and of environmental pollution. Another problem resides in that bleeding of the plasticizer contained therein may cause indoor pollution, so that limiting the use of vinyl chloride-base resin is becoming a worldwide trend.

Solutions for these problems can be found in developmental activities for materials using polyolefin-base resin in place of vinyl chloride-base resin.

The polyolefin-base resin is, however, disadvantageous in that having crystallinity. When the polyolefin-base resin is used in a form of a stretched film, the processability in embossing will be degraded as compared with that of vinyl chloride-base film due to the molecular orientation induced by the stretching. The poor ink adhesiveness also raises problems in printing picture or pattern by gravure printing, silk screen printing, offset printing and water-base flexographic printing, which is known to result in misalignment of picture or pattern in multi-color printing.

A known general solution for improving the ink adhesiveness relates to, for example, anchor treatment of the film surface, whereas it is not feasible since it tends to push up the production cost. On the other hand, multi-color printing on a polyolefin-base unstretched film has to be carried out under a low tension since the film has only a limited tensile strength in the printing direction, which tends to result in snaking of the film. Raising the tension to prevent such snaking is now likely to cause dimensional change due to elongation, which may result in misalignment of a printed pattern in a first color and that in a second or successive color, to thereby ruin fine printing.

It is therefore an object of the present invention to overcome the foregoing problems in the conventional technology.

That is, the present invention is to provide a stretched film of a thermoplastic resin having a high surface hardness, excellent processability in embossing and desirable ink adhesiveness. It is another object of the present invention is to provide an inexpensive stretched film of a thermoplastic resin allowing fine printing without causing misalignment of patterns in multi-color printing. It is further an object of the present invention is to provide a stretched film of a thermoplastic resin being not causative of environmental pollution nor degradation of incinerators at the time of the waste treatment.

It is still another object of the present invention is to provide a building decorative material having such properties and a method for producing the stretched film of a thermoplastic resin.

DISCLOSURE OF THE INVENTION

The present inventors found out after the extensive studies to accomplish the foregoing objects that desirable effects can be obtained by using a stretched film of a thermoplastic resin comprising a plurality of stretched films individually containing a fine powder differ in the average particle size, and having a porosity of 5 to 60%, which led us to propose the present invention.

That is, the present invention relates to a stretched film of a thermoplastic resin comprising a stretched film base layer (A) containing 40 to 85 wt % of a thermoplastic resin and 60 to 15 wt % of an inorganic or organic fine powder; and a stretched film surface layer(B), being provided at least on one surface of said stretched film base layer (A), containing 30 to 90 wt % of a thermoplastic resin and 70 to 10 wt % of inorganic or organic fine powder having an average particle size smaller than that of the inorganic or organic fine powder contained in the stretched film base layer (A), and has a porosity as expressed by the formula (1) below $$\frac{\rho_0 - \rho_1}{\rho_0} \times 100 \qquad (1)$$

(where $\rho_0$ is the true density of the stretched film of a thermoplastic resin, and $\rho_1$ is the density of the stretched film of a thermoplastic resin) of 5 to 60%.

In a preferred embodiment of the present invention, the inorganic or organic fine powder contained in the stretched film base layer (A) has an average particle size of 0.6 to 3 μm, and the inorganic or organic fine powder contained in the stretched film surface layer (B) has an average particle size of 0.1 to 2 μm. On the surface of the stretched film base layer (A) opposite to the stretched film surface layer (B), a back layer (C) containing 30 to 70 wt % of a thermoplastic resin and 70 to 30 wt % of an inorganic or organic fine powder may further be provided. The inorganic or organic fine powder contained in the back layer (C) preferably has an average particle size of 0.6 to 3 μm.

In another preferred embodiment of the present invention, porosities of the individual layers as expressed by the formula (1) above satisfy the relation of porosity of the surface layer (B)<porosity of the base layer (A)<porosity of the back layer (C).

In still another preferred embodiment of the present invention, any one of the thermoplastic resins is a mixture of a thermoplastic non-elastomer and a thermoplastic elastomer. Any one of the thermoplastic resins is preferably a polyolefin-base resin, an olefin-base thermoplastic elastomer, or a mixture thereof. The mixture preferably contains 5 to 100 weight parts of the olefin-base thermoplastic elastomer per 100 weight parts of the polyolefin-base resin. The melting point of the thermoplastic resin contained in the stretched film surface layer (B) is preferably lower by 10° C. or more than the melting point of the thermoplastic resin contained in the stretched film base layer (A).

In still another preferred embodiment of the present invention, the stretched film surface layer (B) is embossed. It is also preferable that the inorganic or organic fine powder contained in the back layer (C) has a surface finished by hydrophilic treatment. The back layer (C) preferably has a contact angle to water of 10 to 80°.

The present invention is to provide also a building decorative material using any one of the above-described stretched film of a thermoplastic resin.

The present invention also provides a method for producing the above-described stretched film of a thermoplastic resin comprising at least:

a step for stacking at least on one surface of the film base layer (A) a film surface layer (B), said film base layer (A) containing 40 to 85 wt % of a thermoplastic resin and 60 to 15 wt % of inorganic or organic fine powder, and said film surface layer (B) containing 30 to 90 wt % of a thermoplastic resin and 70 to 10 wt % of an inorganic or organic fine powder having an average particle size smaller than that of an inorganic or organic fine powder contained in the film base layer (A); and a step for stretching the obtained stack.

In a preferred embodiment of the present invention, the film base layer (A) is stretched in advance of the stacking. The melting point of the thermoplastic resin contained in the film surface layer (B) is preferably lower by 10° C. or more than the melting point of the thermoplastic resin contained in the film base layer (A). The stretching is preferably effected at a temperature lower by 5° C. or more than the melting point of the thermoplastic resin contained in the film surface layer (B). It is also preferable to provide, on the surface of the film base layer (A) opposite to the film surface layer (B), a back layer (C) containing 30 to 70 wt % of a thermoplastic resin and 70 to 30 wt % of an inorganic or organic fine powder. The stretching is preferably effected by uniaxial stretching.

MODES FOR CARRYING OUT THE INVENTION

Modes for carrying out the present invention will be detailed hereinafter.

The stretched film of a thermoplastic resin according to the present invention has at least on one surface of the stretched film base layer (A) a stretched film surface layer (B). The stretched film base layer (A) contains 40 to 85 wt % of a thermoplastic resin and 60 to 15 wt % of an inorganic or organic fine powder. The stretched film surface layer (B) contains 30 to 90 wt % of a thermoplastic resin and 70 to 10 wt % of inorganic or organic fine powder having an average particle size smaller than that of the inorganic or organic fine powder contained in the stretched film base layer (A).

On the surface of the stretched film base layer (A) opposite to the stretched film surface layer (B), a back layer (C) may be provided. The back layer (C) preferably contains 30 to 70 wt % of a thermoplastic resin and 70 to 30 wt % of an inorganic or organic fine powder may further be provided.

There are no special limitations on the species of the thermoplastic resins available for the base layer (A), surface layer (B) and back layer (C).

Examples of such thermoplastic resin include polyolefin-base resins such as ethylene-base resin (e.g., high-density polyethylene and middle-density polyethylene), propylene-base resin, polymethyl-1-pentene and etylene-cyclic olefin copolymer; polyamide-base resins such as 6-nylon, 6,6-nylon and 6,T-nylon; thermoplastic polyester-base resin such as polyethylene terephthalate or copolymers thereof, polypropylene terephthalate or copolymers thereof and aliphatic polyester; polycarbonate; atactic polystyrene and syndiotactic polystyrene.

Among these particular preferable are non-polar polyolefin-base resins. The polyolefin-base resins include homopolymers of $C_{2-8}$ α-olefins such as ethylene, propylene, 1-butene, 1-hexene, 1-heptene, 1-octene, 4-methyl-1-pentene and 3-methyl-1-pentene; and copolymers of 2 to 5 species selected from these α-olefins. The copolymer may be a random copolymer or block copolymer. More specifically, they are exemplified as branched or straight-chained polyethylene having a density of 0.89 to 0.97 g/cm$^3$ and a melt flow rate (at 190° C., under 2.16 kg load) of 1 to 10 g/10 min; and propylene homopolymer, propylene-ethylene copolymer, propylene-1-butene copolymer, propylene-ethylene-1-butene copolymer, propylene-4-methyl-1-pentene copolymer, propylene-3-methyl-1-pentene copolymer, poly(1-butene), poly(4-methyl-1-pentene) or propylene-ethylene-3-methyl-1-pentene copolymer having a melt flow rate (at 230° C., under 2.16 kg load) of 0.2 to 8 g/10 min. Among these, especially preferable are propylene homopolymer, propylene-ethylene random copolymer and high-density polyethylene for their inexpensiveness and desirable processability.

Among various polyolefin-base resins, propylene-base resin is in particular preferable in terms of chemical resistance and cost. Preferable propylene-base resin includes isotactic or syndiotactic polymer consisting only of propylene monomers. It is also preferable to use stereospecific copolymers of various types mainly consisting of polypropylene and copolymeric α-olefin(s) such as ethylene, 1-butene, 1-hexene, 1-heptene and 4-methyl-1-pentene. The copolymer may be of two-component-system or of higher component system, and may be a random copolymer or block copolymer. The propylene-base resin preferably contains 2 to 25 wt % of a resin lower in the melting point than propylene homopolymer. Such resin having a low melting point is typified by high-density or low-density polyethylene.

Thermoplastic elastomer is one special choice for the thermoplastic resin available for composing the base layer (A), surface layer (B) or back layer (C).

In the present specification, the term "thermoplastic elastomer" denotes those composed of an elastic rubber component (soft segment) and a molecule-constraining component for preventing plastic deformation (hard segment) within a molecule, in which the hard segment is responsible for the rubber-like property through acting similarly as a vulcanization point in a vulcanized rubber at the room temperature, and is also responsible for the fluidizing property when fused under heating. In this specification, other types of thermoplastic resins will be referred to as "thermoplastic non-elastomer".

There are a variety of known thermoplastic elastomers differ in the species of the soft segment and hard segment, molecular weight and arrangement. Known styrene-base thermoplastic elastomers include Tuftec® (product of Asahi Chemical) and Rabalon® (product of Mitsubishi Chemical Corporation). Known olefin-base thermoplastic elastomers include Milastomer® (product of Mitsui Chemicals) and Thermorun® (product of Mitsubishi Chemical Corporation). Known polyester-base thermoplastic elastomer include Hytrel® (product of Du Pont-Toray Co., Ltd.) and Pelprene® (product of Toyobo Co., Ltd.). Beside these also known are polyurethane-base thermoplastic elastomes.

Among these, the olefin-base thermoplastic elastomer is particularly preferable.

The thermoplastic resin for use in the base layer (A), surface layer (B) or back layer (C) can be selected from those listed above and may be used individually or in an arbitral combination. The combined use of two or more elastomers allows mixing of thermoplastic non-elastomer(s) and thermoplastic elastomer(s). For the case that both types of the elastomers are mixed, it is preferable to use 5 to 100 weight parts of the thermoplastic elastomer per 100 weight parts of the thermoplastic non-elastomer in terms of processability in embossing and printing. In particular, selecting the amount of compounding of the thermoplastic elastomer as 5 to 50 weight parts for the base layer (A) and 20 to 100 weight parts for the surface layer (B) results in a higher porosity in the base layer (A) than in the surface layer (B), which is preferable in terms of improving processability in embossing or printing, and raising the surface hardness.

The base layer (A), surface layer (B) or back layer (C) can employ the same thermoplastic resin or different thermoplastic resins. The thermoplastic resins may be properly selected according to the properties required for the individual layers.

The surface layer (B) is often subjected to a variety of printing and then finished by embossing or the like since the stretched film of the present invention can also be intended for use as a building decorative material. Thus the surface layer (B) requires an excellent printability allowing high-definition print based on various printing systems and adhesiveness sufficient for preventing ink drop during embossing. To fully satisfy such requirements, the surface layer (B) preferably contains a thermoplastic resin lower in the melting point than the base layer (A). More specifically, it is preferable to use for the surface layer (B) a thermoplastic resin having a melting point lower by 10° C. or more than that contained in the base layer (A).

There is no special limitation on the melting point of the thermoplastic resin for use in the back layer (C), and the melting point may be the same with those of the thermoplastic resins contained in the base layer (A) and surface layer (B), or may be different from those.

There are no special limitations on the organic or inorganic fine powder for use in the base layer (A), surface layer (B) or back layer (C).

The inorganic fine powder may be of, for example, heavy calcium carbonate, precipitated calcium carbonate, clay, talc, titanium oxide, barium sulfate, zinc oxide, magnesium oxide, diatom earth or silicon oxide. Among these, heavy calcium carbonate, clay and diatom earth are particularly preferable since they are inexpensive and can effectively form pores during the stretching.

The organic fine powder may be of, for example, polyethylene terephthalate, polybutylene terephthalate, polyamide, polycarbonate, polyethylene naphthalate, polystyrene, melamine resin, polyethylene sulfite, polyimide, polyethyl ether ketone or polyphenylene sulfite. Among these, those having a melting point higher than that of the thermoplastic resin employed together and being non-compatible therewith are preferable for effective formation of the pore.

The fine powder for use in the base layer (A), surface layer (B) or back layer (C) can be selected from those listed above and may be used individually or in an arbitral combination. The combined use of two or more fine powders allows mixing of organic fine powder(s) and inorganic fine powder(s).

The base layer (A), surface layer (B) or back layer (C) can employ the same fine powder or different fine powders. The fine powder used for the surface layer (B) is now selected so that the average particle size thereof is smaller than that used for the base layer (A). Such adjustment of the particle size will successfully reduce surface projections after the stretching to thereby improve the surface smoothness, and will further improve the high-definition printing.

The average particle size of the fine powder for use in the base layer (A) is preferably within a range from 0.6 to 3 μm. An average particle size of 0.6 μm or larger allows the pores (or voids) to be formed in more sufficient amount by the stretching. An average particle size of 3 μm or below allows the pores to be formed in a proper size to thereby effectively prevent the film from being corrugated.

The average particle size of the fine powder for use in the surface layer (B) is preferably within a range from 0.1 to 2 μm. Adjusting the average particle size within such range will help generation of micro-cracks on the surface the layer to thereby improve ink adhesiveness and to prevent white defect during printing. For the surface layer (B), content of coarse particle of 44 μm or larger in diameter, which is causative of projection on the surface of the stretched film of a thermoplastic resin, is preferably suppressed to 10 ppm or below.

The average particle size of the fine powder for use in the back layer (C) is preferably within a range from 0.6 to 3 μm based on the same requirements for the base layer (A). It is more preferable now for the back layer (C) to use an inorganic fine powder having the surface thereof finished by hydrophilic treatment. The hydrophilic treatment can be accomplished by wet grinding of an inorganic compound under the presence of an anionic, cationic or nonionic water-soluble polymer surfactant having an average molecular weight of 1,000 to 150,000. The hydrophilic treatment can also be effected by using an anionic, cationic or nonionic antistatic agent during the wet grinding of an inorganic compound. Both of these treatments can be effected in two successive stages. A preferable example of an inorganic fine powder finished by the hydrophilic treatment can be found in Japanese Laid-Open Patent Publication No. 7-300568.

Using an inorganic fine powder having an average particle size of 0.6 to 3 μm and finished by the above two-stage treatment will allow the back layer (C) to have a contact angle to water (water contact angle) within a preferable range. A preferable range for the water contact angle is 10 to 80°, and more preferably 20 to 70°. The contact angle smaller than 10° may result in too rapid water penetration, which will cause too much penetration of a glue component when a water-base glue is applied to the back layer (C). This increases an amount of glue to be coated and thus pushes up the production cost. On the other hand, the contact angle larger than 80° may result in too slow water penetration, which will cause too slow drying of the glue, lower the productivity and thus raise the production cost. It is also disadvantageous in that too small penetration of the adhesive component will weaken the adhesion strength of an adhesive to the stretched film of a thermoplastic resin. Now the water contact angle in the context of this specification refers to those obtained from measurement with a contact angle gauge Model CA-D (product of Kyowa Kaimen Kagaku K.K.).

Using an inorganic fine powder thus finished by hydrophilic treatment for the back layer (C) and thus improving the wettability can upgrade adhesion strength and drying speed of a water-base adhesive coated on the back layer (C).

The back layer (C) is also allowed to have an antistatic property by using an inorganic fine powder treated with an antistatic agent. The stretched film of a thermoplastic resin thus treated will not be causative of charging failure during coating of, for example, an adhesive or sticking agent for lining or the like, and will be excellent in drying speed and adhesiveness.

In the present invention, the individual layers can be formed by mixing the above thermoplastic resin and fine powder.

For the base layer (A), 40 to 85 wt % of a thermoplastic resin and 60 to 15 wt % of an inorganic or organic fine powder are mixed. An amount of the fine powder exceeding 60 wt % will prevent easy production of the stretched film of a thermoplastic resin with an uniform thickness, whereas an amount less than 15 wt % will degrade the processability in embossing due to a lesser amount of pores produced by the stretching.

For the surface layer (B), 30 to 90 wt % of a thermoplastic resin and 70 to 10 wt % of an inorganic or organic fine powder are mixed. An amount of the fine powder exceeding 70 wt % will prevent uniform stretching, which tends to generate cracks on the surface of the obtained stretched film of a thermoplastic resin and ruins the practical value. On the other hand, an amount of the fine powder less than 10 wt % will degrade the ink adhesiveness.

For the back layer (C), 30 to 70 wt % of a thermoplastic resin and 70 to 30 wt % of an inorganic or organic fine powder are mixed. An amount of the fine powder exceeding 70 wt % will prevent easy production of the stretched film of a thermoplastic resin with an uniform thickness. It is particularly preferable for an inorganic fine powder finished by hydrophilic treatment to be used in an amount of 10 wt % or more for full exhibition of the hydrophilicity.

For the case that a mixture of a polyolefin-base resin and an olefin-base thermoplastic elastomer is used as the thermoplastic resin, the olefin-base thermoplastic elastomer is preferably used in an amount of 5 to 50 weight parts per 100 weight parts of the polyolefin-base resin for the base layer (A), and 20 to 100 weight parts for the surface layer (B). Mixing within the above ranges allows the base layer (A) and the surface layer (B) to have optimum porosity achieved by the stretching and excellent surface hardness. That is, the pores formed by the stretching can effectively absorb the thermal deformation of the resin portion during embossing, so that the processability in embossing is improved, and effective embossing almost equivalent to that for vinyl chloride film can be achieved.

When the fine powder is mixed into the thermoplastic resin by kneading, additives such as dispersion aid, antioxidant, solubilizing agent, flame retarder, ultraviolet stabilizer, coloring pigment or the like can optionally be added. In particular for the base layer (A) and the surface layer (B), it is preferable to give a desirable color using an inorganic or organic coloring pigment. It is also preferable to add an antioxidant or ultraviolet stabilizer for the stretched film of a thermoplastic resin intended for use as a durable material. For the case using an organic fine powder, proper selection of a type and amount of addition of a solubilizing agent is critical since they govern the particle morphology of the organic fine powder. Maleic acid-denatured polypropylene (Umex®, product of Sanyo Chemical Industries, Ltd.) is a preferable example of such solubilizing agent. The amount of addition of the solubilizing agent is preferably 0.5 to 10 weight parts per 100 weight parts of the organic fine powder.

In the production of the stretched film of a thermoplastic resin of the present invention, a stack is prepared using a compound containing a thermoplastic resin, fine powder and other additional components. The ratio of the thickness of the base layer (A) and surface layer (B) within the stack is preferably 9:1 to 5:5 from viewpoints of the surface hardness and processability in printing or embossing. For the case providing the back layer (C), the stack is preferably prepared so as to satisfy the relation of the thickness of "surface layer (B):base layer (A):back layer (C)=(1 to 3):(8 to 4):(1 to 3)". Such selection of the thickness of the individual layers can provide the stretched film of a thermoplastic resin excellent in the surface hardness, processability in pringin or embossing, and emboss relaxation resistance. For the case having the three-layered structure, the thickness ratio of the base layer (A) less than 4 is undesirable since the processability in embossing will be ruined.

The stretched film of a thermoplastic resin of the present invention can be produced by any combination of a variety of methods known to those skilled in the art. Any stretched film of a thermoplastic resin produced by any method will be comprehended within the scope of the present invention as long as it satisfies the conditions as defined in Claim 1. Thus the stretched film may be obtained by stacking the base layer (A), surface layer (B) and back layer (C) each of which being individually stretched before the stacking; or may be obtained by stretching the stack en bloc after the base layer (A), surface layer (B) and back layer (C) are stacked. Or it is also allowable to stretch a stack of the base layer (A) and surface layer (B), and then stack thereon the stretched or unstretched back layer (C). These methods may properly be combined.

A preferable method for the production relates to such that having a step for stacking the base layer (A), surface layer (B) and back layer (C); and a step for stretching the obtained stack en bloc, which is simpler and costless as compared with the case stretching the individual layers separately before the stacking. The method is also beneficial in that the pores formed in the base layer (A) and surface layer (B) can be controlled more simply. It is particularly preferable to control the pores so as to be formed by the stretching in a larger amount in the base layer (A) than in the surface layer (B), to thereby allow the base layer (A) to serve as a layer responsible for effectively improving the processability in embossing.

The stretching may be effected by a variety of known methods. The stretching temperature can be selected equals to or higher than the glass transition point of a thermoplastic resin employed when the thermoplastic resin is an amorphous resin, and can be selected within a range from the glass transition point of the amorphous portion to the melting point of the crystalline portion of a thermoplastic resin employed when the thermoplastic resin is a crystalline resin. It is preferable that the stretching temperature is lower by 5° C. or more than the melting point of the thermoplastic resin contained in the surface layer (B), and lower by 15° C. or more than the melting point of the thermoplastic resin contained in the base layer (A). In particular for the case that inter-roll stretching is applied, the film of thermoplastic resin will be likely to stick onto the rolls to thereby generate undesirable sticking mark on the surface of the stretched film unless the temperature is set as described above. Improper setting of the temperature will also result in poor formation of the micro-cracks, which tends to lower the ink adhesiveness.

Specific examples of the stretching include inter-roll stretching using roll groups differ in the peripheral speed, and clip stretching using a tenter oven. Uniaxial inter-roll stretching is in particular preferable in that a magnitude of stretching can arbitrarily be selected and thus the size and number of formation of the obtained pores can be controlled. Uniaxial stretching of all the layers en bloc can produce the pores and cracks both in a football shape, and can generate finer and a larger number of pores than in biaxial stretching. The method is also beneficial in that the resin is oriented during the stretching along the feeding direction of the film so that the obtained stretched film of a thermoplastic resin will have a higher tensile strength as compared with that of an unstretched film, and will also be minimum in dimensional changes due to tensile force applied during printing or other processing. The degree of the orientation of the resin is, however, small as compared that in biaxial stretching so that the obtained stretched film of a thermoplastic resin will have an excellent resistivity against emboss relaxation.

There is no special limitation on the magnitude of the stretching and the magnitude can properly be determined depending on purpose of use of the stretched film of the thermoplastic resin of the present invention and properties of the thermoplastic resin employed. For example for the case using propylene homopolymer or copolymer as the thermoplastic resin, typical magnitude for the uniaxial stretching is within a range from approx. 1.2 to 12 times, and preferably 2 to 7 times; and areal magnitude for the biaxial stretching is within a range from 1.5 to 60 times, and preferably 10 to 50 times. For the case using other thermoplastic resin, typical magnitude for the uniaxial stretching is within a range from approx. 1.2 to 10 times, and preferably 2 to 7 times; and areal magnitude for the biaxial stretching is within a range from 1.5 to 20 times, and preferably 4 to 12 times.

Annealing at a high temperature may optionally be allowable. The stretching speed is preferably 20 to 350 m/min.

The stretched film of a thermoplastic resin of the present invention has a porous structure involving micro-pores, and has a porosity calculated from the formula (1) of 5 to 60%. The porosity below 5% will degrade the processability in embossing. On the other hand, the porosity exceeding 60% will degrade the material strength of the film, which will readily result in surface destruction due to sticking of an adhesive tape or the like.

The porosities of the individual layer preferably satisfy the relation, as expressed by the name of the layers, of "surface layer (B)<base layer (A)<back layer (C). Although being not constrained by any theory, it is supposed that satisfying such condition relating to the porosity allows absorbing the thermal deformation of the resin portion during the embossing, to thereby improve the processability in embossing or relaxation resistance. Formation of microcracks in the surface layer (B) also improves the processability in printing.

In the formula (1), $\rho_0$ represents the true density of the stretched film of a thermoplastic resin or the individual layer, and $\rho_1$ represents the density of the stretched film of a thermoplastic resin or the individual layer. Unless otherwise the material before stretching contains a large volume of air, the true density is almost equal to the density before stretching. The density of the stretched film of a thermoplastic resin of the present invention is preferably within a range from 0.60 to 1.20 g/cm$^3$.

The stretched film of a thermoplastic resin of the present invention may be used intact or in a form further laminated on some other thermoplastic film or the like. Such further lamination is allowable on a transparent or opaque film such as, for example, polyester film, polyamide film or polyolefin film.

There is no special limitation on the thickness of the stretched film of a thermoplastic resin of the present invention, and can be made into a thickness of 30 to 400 μm, and more preferably 60 to 200 μm. It is also allowable to further laminate the stretched film on other film to attain a total thickness of 1 mm or around.

The stretched film of a thermoplastic resin of the present invention is quite versatile. Typical applications include wall paper for building decoration, decorative paper for decorative plywood, floor material, car interior material and tack label. In particular for the stretched film intended for use as a building decorative material, the thickness of the base layer (A) preferably accounts for 50% or more of the total thickness to improve the processability in embossing.

The surface layer (B) of the stretched film of a thermoplastic resin according to the present invention may have a print depending on purposes. The printing can be effected by known printing techniques such as gravure printing, water-base flexography, silk screen or UV offset press printing. Metal vapor deposition, gross printing and matt printing are also available. Patterns to be printed can properly be selected from stone grain, wood grain, grid, polka dots, flower or other natural patterns, abstract pattern and characters.

The stretched film of a thermoplastic resin of the present invention can be embossed. While the embossing is generally follows the printing, the embossing may further be followed by the printing.

The embossing can be effected by transferring surface irregularity of an embossing plate under heat or pressure using various known pressing or embossing apparatus such as plate pressing machine or roll embossing machine. The roll embossing is a method for thermo-compressively transferring surface irregularity on the cylindrical embossing plate onto a target material. Such thermo-compressive transfer is carried out by heating the stretched film of a thermoplastic resin to a temperature between the heat deformation temperature and the fusing temperature of the resin contained in the surface layer (B), pressing the embossing plate to the surface of the stretched film of a thermoplastic resin, and cooling to fix the shape. The heating can be effected, for example, by infrared irradiation, hot wind blowing, heat conduction through heating rollers and inductive heating. The embossing can also effected simultaneously with the film forming before or after the stretching without using an embossing apparatus.

The stretched film of a thermoplastic resin of the present invention intended for use as a decorative plywood can improve its design value if the film is subjected to wiping after the embossing to thereby be filled in the recesses with a wiping ink. This is in particular desirable for reproducing the appearance of the tracheary portion in the wood grain.

It is also preferable that the outermost layer of the film is further provided with a surface protective layer made of a transparent resin layer. The surface protective layer not only protects the surface layer (B) but also adds a stereographic effect to the design such as underlying picture or embossed pattern. Thus the surface protective layer is in particular effective when the stretched film of a thermoplastic resin of the present invention is intended for use as a decorative board or wall paper.

The surface protective layer can be formed by coating or laminating. To further improve the surface property, it is preferable to use a colorless or colored transparent resin excellent in weatherability, abrasion resistance and antifouling property. Preferable examples of such resin include various acrylates and polyesters, ionizing radiation-curing resin, polyurethane, two-liquid curing resin such as unsaturated polyester, fluorine-containing resin and polysiloxane-base resin. The surface protective layer may be compounded with a known antibacterial agent, mildew-proofing agent, perfume or the like.

The stretched film of a thermoplastic resin after processed by printing or embossing can be laminated on the back side thereof with some other material. For example the film intended for use as a wall paper or floor material can be laminated with a backing paper or so. There is no special limitation on the materials used for the backing paper, and available material is any one of papers such as tissue paper and craft paper; inorganic fibers such as glass fiber and carbon fiber; woven fabric; non-woven fabric; resin film or sheet; metal foil and wood material. These materials may be combined by a known technique such as adhesion or heat fusion to be used as a composite material.

It is also allowable to laminate the stretched film of a thermoplastic resin of the present invention with a metal plate such as an iron plate and aluminum plate with the aid of an adhesive or heat fusion, to thereby be provided as a decorative resin board baked with a plate member. It is also allowable to laminate the stretched film of a thermoplastic resin of the present invention on various types of plywood using an adhesive to obtain a resin decorative plywood. It is still also allowable to form on the back side a sticking agent layer with or without separation sheet to thereby produce a wall paper of a tack seal type.

EXAMPLES

The present invention will be detailed referring to specific examples. Materials, amount of use thereof, ratio of use, operations or the like can properly be modified without departing from the spirit of the present invention. Thus it is to be understood that the present invention is by no means limited to the specific examples explained below.

In the following Examples and Comparative Examples, materials listed in Table 1 were selected and used.

TABLE 1

| Materials | Description |
| --- | --- |
| Thermoplastic resin (a) | propylene homopolymer, MFR = 2.0 g/10 min (230° C., 2.16 kg load), m.p. 164° C. (DSC peak temperature) (product of Mitsubishi Chemical Corporation) |
| Thermoplastic resin (b) | ethylene-propylene random copolymer, MFR = 10 g/10 min (230° C., 2.16 kg load), m.p. 137° C. (DSC peak temperature) (product of Mitsubishi Chemical Corporation) |
| Thermoplastic resin (c) | ethylene-propylene copolymer, MFR = 2.0 g/10 min (230° C., 2.16 kg load), m.p. 145° C. (DSC peak temperature) (product of Mitsubishi Chemical Corporation) |
| Thermoplastic resin (d) | straight-chained polyethylene, MFR = 2.6 g/10 min (190° C., 2.16 kg load), m.p. 126° C. (product of Mitsubishi Chemical Corporation) |
| Thermoplastic resin (e) | propylene homopolymer, MFR = 10 g/10 min (230° C., 2.16 kg load), m.p. 164° C. (DSC peak temperature) (product of Mitsubishi Chemical Corporation) |
| Thermoplastic resin (f) | propylene homopolymer, MFR = 4.0 g/10 min (230° C., 2.16 kg load), m.p. 164° C. (DSC peak temperature) (product of Mitsubishi Chemical Corporation) |
| Thermoplastic resin (g) | ethylene-propylene copolymer, MFR = 4.0 g/10 min (230° C., 2.16 kg load), m.p. 145° C. (DSC peak temperature) (product of Mitsubishi Chemical Corporation) |
| Thermoplastic resin (h) | low-density polyethylene, MFR = 2.6 g/10 min (190° C., 2.16 kg load), m.p. 108° C. (product of Mitsubishi Chemical Corporation) |

TABLE 1-continued

| Materials | Description |
| --- | --- |
| Elastomer | olefin-base thermoplastic elastomer "Thermorun ®", MFR = 3.6 g/10 min, m.p. 152° C. (product of Mitsubishi Chemical Corporation) |
| Inorganic fine powder (α) | calcium carbonate (product of Shiroishi Calcium Co., Ltd.) |
| Inorganic fine powder (β) | calcium carbonate "AFF", treated with a water-soluble cationic surfactant during wet grinding, and then surface treated with an anionic antistatic agent (product of Phimatech Co., Ltd.) |
| Solubilizing agent | Maleic acid-denatured polypropylene "Umex ®", (product of Sanyo Chemical Industries, Ltd.) |

Example 1

To a mixture of 47 wt % of thermoplastic resin (a), 23 wt % of the elastomer and 2 wt % of the solubilizing agent, 28 wt % of inorganic fine powder (α) having an average particle size of 1.8 μm was added to obtain compound (A). Independently to a mixture of 30 wt % of thermoplastic resin (b), 20 wt % of the elastomer and 2 wt % of the solubilizing agent, 48 wt % of inorganic fine powder (α) having an average particle size of 1.2 μm was added to obtain compound (B). Compounds (A) and (B) were individually kneaded under fusion in separate extruders at 250° C., extruded so that compound (B) is laminated within a die on both planes of compound (A), then cooled to 70° C. by a cooling apparatus to obtain an unstretched sheet.

The sheet was heated to 125° C., and stretched by 5 times in the longitudinal direction. The obtained film was then processed on both surfaces with corona discharge treatment at 50 W/m² using a discharge treatment apparatus (product of Kasuga Denki K.K.). Thus finished three-layered stretched film has a constitution of (B)/(A)/(B) in a thickness of 15 μm/50 μm/15 μm, a density of 0.85 g/cm³, and a porosity of 29%.

The obtained stretched film was subjected to gravure printing to print a wood grain pattern (product name CCST, product of Toyo Ink Mfg. Co., Ltd.) on the surface layer (B) thereof, and then embossed using embossing rolls heated to 100° C. to form embossed wood grain pattern. Further thereon an UV curing resin (product of Dainichiseika Color & Chemicals Mfg. Co., Ltd.) was coated in an amount of 8 g/m², the coated film was irradiated twice at 10 m/min using a high-pressure mercury lamp (80 w), to thereby obtain an embossed stretched film.

Example 2

To a mixture of 55 wt % of thermoplastic resin (c), 13 wt % of the elastomer and 2 wt % of the solubilizing agent, 30 wt % of inorganic fine powder (α) having an average particle size of 1.8 μm was added to obtain compound (A). Independently to a mixture of 25 wt % of thermoplastic resin (d), 25 wt % of the elastomer and 2 wt % of the solubilizing agent, 48 wt % of inorganic fine powder (α) having an average particle size of 1.0 μm was added to obtain compound (B). Compounds (A) and (B) were individually kneaded under fusion in separate extruders at 250° C., extruded so that compound (B) is laminated within a die on both planes of compound (A), then cooled to 70° C. by a cooling apparatus to obtain an unstretched sheet.

The sheet was heated to 115° C., and stretched by 3.5 times in the longitudinal direction. The obtained film was then processed on both surfaces with corona discharge treatment at 50 W/m² using a discharge treatment apparatus (product of Kasuga Denki K.K.). Thus finished three-layered stretched film has a constitution of (B)/(A)/(B) in a thickness of 20 µm/50 µm/20 µm, a density of 0.95 g/cm³, and a porosity of 22%.

The obtained stretched film was embossed in a manner similar to that described in Example 1.

Example 3

To a mixture of 63 wt % of thermoplastic resin (a), 5 wt % of the elastomer and 2 wt % of the solubilizing agent, 30 wt % of inorganic fine powder (α) having an average particle size of 1.5 µm was added to obtain compound (A). Compound (A) was then kneaded under fusion in an extruder, extruded from the die, and cooled to 70° C. by a cooling apparatus to obtain an unstretched sheet. The sheet was then heated to 125° C. and stretched by 5 times in the longitudinal direction.

Independently to a mixture of 40 wt % of thermoplastic resin (b), 10 wt % of the elastomer and 2 wt % of the solubilizing agent, 48 wt % of inorganic fine powder (α) having an average particle size of 1.0 µm was added to obtain compound (B). Compounds (B) was then kneaded under fusion in two extruders at 250° C., and then extruded so as to be laminated on both planes of the quintiple stretched sheet already obtained in the above.

The obtained three-layered sheet was heated to 155° C., and stretched by 8 times in the transverse direction using a tenter stretcher. The obtained film was then processed on both surfaces with corona discharge treatment at 50 W/m² using a discharge treatment apparatus (product of Kasuga Denki K.K.). Thus finished three-layered stretched film has a constitution of (B)/(A)/(B) in a thickness of 20 µm/40 µm/20 µm, a density of 0.8 g/cm³, and a porosity of 34%.

The obtained stretched film was embossed in a manner similar to that described in Example 1.

Examples 4 to 6

Stretched films and embossed stretched films were prepared similarly to Example 1 except that the amounts of blend and particle sizes of the inorganic fine powder were selected as listed in Table 2.

TABLE 2

| Example (layer) | | Thermo-plastic resin (a) | Elastomer | Solubilizing agent | Inorganic fine powder (α) (average particle size) |
|---|---|---|---|---|---|
| 4 | (A) | 30% | 12% | 3% | 55% (1.2 µm) |
|   | (B) | 47% | 37% | 1% | 15% (0.6 µm) |
| 5 | (A) | 55% | 26% | 1% | 18% (2.5 µm) |
|   | (B) | 27% | 5% | 3% | 65% (1.8 µm) |
| 6 | (A) | 70% | 0% | 0% | 30% (1.8 µm) |
|   | (B) | 50% | 0% | 0% | 50% (1.0 µm) |

Comparative Example 1

Seventy wt % of thermoplastic resin (a) and 30 wt % of inorganic fine powder (α) having an average particle size of 1.8 µm were blended to obtain compound (A). Independently 52 wt % of thermoplastic resin (e) and 48 wt % of inorganic fine powder (a) having an average particle size of 1.8 µm were blended to obtain compound (B). Compounds (A) and (2) were individually kneaded under fusion in separate extruders at 250° C., extruded so that compound (B) is laminated within a die on both planes of compound (A), then cooled to 70° C. by a cooling apparatus to obtain an unstretched sheet. The sheet was heated to 150° C., and stretched by 5 times in the longitudinal direction.

The obtained stretched sheet was then processed on both surfaces with corona discharge treatment at 50 W/m² using a discharge treatment apparatus (product of Kasuga Denki K.K.). Thus finished three-layered stretched film has a constitution of (B)/(A)/(B) in a thickness of 15 µm/50 µm/15 µm, a density of 1.15 g/cm³, and a porosity of 4%.

The obtained stretched film was embossed in a manner similar to that described in Example 1.

Comparative Example 2

To a mixture of 35 wt % of thermoplastic resin (a), 33 wt % of the elastomer and 2 wt % of the solubilizing agent, 30 wt % of inorganic fine powder (α) having an average particle size of 1.8 µm was added to obtain compound (A). Independently to a mixture of 40 wt % of thermoplastic resin (b), 10 wt % of the elastomer and 2 wt % of the solubilizing agent, 48 wt % of inorganic fine powder (α) having an average particle size of 1.2 µm was added to obtain compound (B). Compounds (A) and (B) were individually kneaded under fusion in separate extruders at 250° C., extruded so that compound (B) is laminated within a die on both planes of compound (A), then cooled to 70° C. by a cooling apparatus to obtain an unstretched sheet.

The obtained unstretched sheet was then processed on both surfaces with corona discharge treatment at 50 W/m² using a discharge treatment apparatus (product of Kasuga Denki K.K.). Thus finished three-layered unstretched film has a constitution of (B)/(A)/(B) in a thickness of 15 µm/50 µm/15 µm, a density of 1.2 g/cm³, and a porosity of 1%.

The obtained unstretched film was embossed in a manner similar to that described in Example 1.

Comparative Example 3

Seventy wt % of thermoplastic resin (a) and 30 wt % of inorganic fine powder (α) having an average particle size of 1.8 µm were blended to obtain compound (A). Independently 52 wt % of thermoplastic resin (e) and 48 wt % of inorganic fine powder (α) having an average particle size of 1.8 µm were blended to obtain compound (B). Compounds (A) and (B) were individually kneaded under fusion in separate extruders at 250° C., extruded so that compound (B) is laminated within a die on both planes of compound (A), then cooled to 70° C. by a cooling apparatus to obtain an unstretched sheet.

The obtained unstretched sheet was then processed on both surfaces with corona discharge treatment at 50 W/m² using a discharge treatment apparatus (product of Kasuga Denki K.K.). Thus finished three-layered unstretched film has a constitution of (B)/(A)/(B) in a thickness of 15 µm/55 µm/15 µm, a density of 1.18 g/cm³, and a porosity of 1%.

The obtained stretched film was embossed in a manner similar to that described in Example 1.

Test Example 1

Individual films obtained in Examples 1 to 6 and Comparative Examples 1 to 3 were tested and evaluated. The stretched and unstretched films before the embossing were tested also for surface hardness. The embossed films were evaluated for processability in embossing and ink adhesiveness.

(1) Surface Hardness of Stretched and Unstretched Films Before Embossing

An adhesive tape (product name "Cellotape", product of Nichiban Co., Ltd.) was stuck on the surface of the stretched or unstretched films, fully pressed, and then peeled off using a tension tester (product name "Autograph", product of Shimadzu Corporation) at a velocity of 1,000 mm/min. Surface conditions of the film from which the tape was peeled off were judged according to the criteria below:

⊚: no change observed;

○: practically of no problem despite a slight fluffing observed on the surface;

Δ: practically undesirable with a lot of fluffing on the surface; and

X: practically of no use with peeling within the film layer observed.

(2) Processability in Embossing of Embossed Films

The films were visually checked and evaluated according to the criteria below:

○: embossed with stereographic effect and sharpness;

Δ: practically of no problem with stereographic effect despite a slight lack in sharpness; and X: practically of no use with a significant lack of stereographic effect and sharpness, and shallow emboss recesses.

(3) Ink Adhesiveness of Embossed Films

An adhesive tape (product name "Cellotape", product of Nichiban Co., Ltd.) was stuck on the surface of the gravure-printed films, fully pressed, and then peeled off at a constant velocity and angle. Status of ink removal was visually checked and evaluated according to the criteria below:

⊚: no ink removal observed;

○: practically of no problem despite a destruction of the film material observed;

Δ: practically undesirable with removal of most portion of the ink while resistance during the peeling sensible; and X: practically of no use with removal of entire portion of the ink but without sensible resistance during the peeling.

Results of the individual tests were listed in Table 3 together with the porosity.

TABLE 3

| | Film before embossing | | Embossed film | |
|---|---|---|---|---|
| | porosity (%) | Surface Hardness | Processability in embossing | Ink adhesiveness |
| Example 1 | 29 | ○ | ○ | ⊚ |
| Example 2 | 22 | ⊚ | ○ | ⊚ |
| Example 3 | 34 | ○ | ○ | ⊚ |
| Example 4 | 48 | ⊚ | ○ | ○ |
| Example 5 | 8 | ○ | ○ | ⊚ |
| Example 6 | 35 | ○ | ○ | ○ |
| Comparative Example 1 | 4 | Δ | Δ | ○ |
| Comparative Example 2 | 1 | ⊚ | x | Δ |

TABLE 3-continued

| | Film before embossing | | Embossed film | |
|---|---|---|---|---|
| | porosity (%) | Surface Hardness | Processability in embossing | Ink adhesiveness |
| Comparative Example 3 | 1 | ⊚ | x | Δ |

Examples 7 to 11 and Comparative Examples 4 to 6

Stretched films of the thermoplastic resin were prepared according to the procedures described below, and using thus prepared films wall papers were further produced. Types and amounts of the materials used for preparing the individual films, stretching conditions and properties of the obtained films were listed in Table 4.

The thermoplastic resin, elastomer and inorganic fine powder were mixed to prepare compounds (A), (B) and (C), respectively. These compounds were individually kneaded under fusion in three extruders at 250° C., extruded so that compound (B) and compound (C) are laminated within a die on the top plane and back plane of compound (A), respectively, then cooled to 70° C. by a cooling apparatus to obtain a three-layered unstretched sheet. The unstretched sheet was then heated to a predetermined temperature and then stretched by predetermined times by inter-roller stretching in the longitudinal direction. The obtained stretched film was then processed on both surfaces with corona discharge treatment at 50 W/m² using a discharge treatment apparatus (product of Kasuga Denki K.K.). Porosity of the individual layers, overall porosity, thickness and density of thus finished three-layered stretched films were listed in Table 4.

Next, the obtained stretched films were subjected to gravure printing to print a floral pattern (product name CCST, product of Toyo Ink Mfg. Co., Ltd.) on the surface layer (B) thereof, and then embossed using embossing rolls heated to 100° C. to form silk texture pattern. Further thereon an UV curing resin (product of Dainichiseika Color & Chemicals Mfg. Co., Ltd.) was coated in an amount of 3 g/m², the coated film was irradiated twice at 10 m/min using a high-pressure mercury lamp (80 W), to thereby obtain an embossed stretched film. On the other hand, a water-soluble starch-base glue was coated using a roll coater in an amount of 5 g/m² on the back layer (C) of the stretched films of the thermoplastic resin, which was followed by drying in a drying apparatus at 80° C., and backing with a released paper, to thereby produce wall papers.

TABLE 4

| | | Thermoplastic resin (type) | wt % | Elastomer (wt %) | Inorganic fine powder (type; size μm) | wt % | Porosity of each layer (%) | Overall porosity (%) | Thickness (μm) | Density (g/cm³) | Stretching conditions Direction | Temp. (° C.) | Magnitude (times) |
|---|---|---|---|---|---|---|---|---|---|---|---|---|---|
| Example 7 | (B) | (b) | 40 | 10 | (α; 1.2) | 50 | 15 | 31 | 80 | 0.85 | uni-axial | 125 | 5 |
| | (A) | (a) | 50 | 20 | (α; 1.8) | 30 | 33 | | | | | | |
| | (C) | (g) | 35 | 5 | (β; 1.2) | 60 | 40 | | | | | | |
| Example 8 | (B) | (d) | 25 | 25 | (α; 1.0) | 50 | 10 | 24 | 80 | 0.95 | uni-axial | 115 | 4 |
| | (A) | (c) | 55 | 13 | (α; 2.5) | 32 | 25 | | | | | | |
| | (C) | (g) | 35 | 5 | (β; 1.2) | 60 | 45 | | | | | | |
| Example 9 | (B) | (h) | 35 | 35 | (β; 0.7) | 30 | 5 | 36 | 90 | 0.77 | uni-axial | 100 | 6 |
| | (A) | (c) | 35 | 10 | (α; 1.0) | 55 | 38 | | | | | | |
| | (C) | (f) | 35 | 5 | (β; 1.0) | 60 | 55 | | | | | | |
| Example 10 | (B) | (b) | 47 | 37 | (α; 0.6) | 16 | 30 | 50 | 80 | 0.60 | uni-axial | 120 | 5 |
| | (A) | (a) | 35 | 10 | (α; 1.8) | 55 | 52 | | | | | | |
| | (C) | (g) | 47 | 37 | (β; 1.8) | 16 | 58 | | | | | | |
| Example 11 | (B) | (g) | 27 | 18 | (α; 1.0) | 55 | 5 | 8 | 80 | 1.10 | uni-axial | 138 | 5 |
| | (A) | (a) | 46 | 36 | (α; 2.5) | 18 | 8 | | | | | | |
| | (C) | (g) | 27 | 8 | (β; 0.7) | 65 | 12 | | | | | | |
| Comparative Example 4 | (B) | (e) | 50 | 0 | (α; 1.8) | 50 | 3 | 2 | 90 | 1.22 | uni-axial | 160 | 5 |
| | (A) | (a) | 70 | 0 | (α; 1.8) | 30 | 1 | | | | | | |
| | (C) | (e) | 50 | 0 | (α; 1.8) | 50 | 3 | | | | | | |
| Comparative Example 5 | (B) | (b) | 40 | 10 | (α; 1.2) | 50 | 0 | 0.8 | 80 | 1.24 | unstretched | | |
| | (A) | (a) | 35 | 35 | (α; 1.8) | 30 | 1 | | | | | | |
| | (C) | (b) | 35 | 5 | (β; 1.0) | 60 | 1 | | | | | | |
| Comparative Example 6 | (B) | (b) | 40 | 10 | (α; 1.2) | 50 | 40 | 61 | 90 | 0.49 | bi-axial | L:130 T:160 | 5 8 |
| | (A) | (a) | 35 | 35 | (α; 1.8) | 30 | 58 | | | | | | |
| | (C) | (b) | 35 | 5 | (β; 1.0) | 60 | 68 | | | | | | |

Test Example 2

The stretched films of the thermoplastic resin obtained in Examples 7 to 11 and Comparative Examples 4 to 6 were tested and evaluated as below.

(1) Processability in Embossing (Facility)

Recesses of the embossing formed on each wall paper were visually observed and judged according to the criteria below:

○: desirable stereographic effect and sharpness;

Δ: practically of no problem with stereographic effect despite a slight lack of sharpness; and X: practically of no use with poor emboss depth and sharpness.

(2) Resistance Against Emboss Relaxation

The backing paper was peeled off from each wall paper, a proper amount of water was applied with a brush on the plane on which the starch-base glue is coated, and the wall paper was stuck on a plywood so as to avoid air trapped between them to thereby produce a wall plate. Two wall plates were then immediately stacked so that the planes having the wall papers stuck thereon come into contact with each other, and pressed under a 300 kg/m² load in a drying apparatus at 60° C. for 3 minutes. The wall plates were taken out and visually checked for changes in the status of the embossing, and judged according to the criteria below:

⊚: no change observed;

○: practically of no problem despite a slight loss in stereographic effect;

Δ: practically undesirable with lack of stereographic effect and with apparent emboss relaxation; and X: practically of no use with an almost complete loss of emboss recesses.

(3) Ink Adhesiveness of Surface Layer (B)

An adhesive tape (product name "Cellotape", product of Nichiban Co., Ltd.) was stuck on the surface of the gravure-printed wall papers, fully pressed, and then peeled off at a constant velocity and a constant angle of 90° with respect to the adhesive plane. Status of ink removal was visually checked and evaluated according to the criteria below:

⊚: no ink removal observed;

○: practically of no problem despite a destruction of the film material observed;

Δ: practically undesirable with removal of most portion of the ink while resistance during the peeling sensible; and X: practically of no use with removal of entire portion of the ink but without sensible resistance during the peeling.

(4) Surface Hardness of the Surface Layer (B)

An adhesive tape (product name "Cellotape", product of Nichiban Co., Ltd.) was stuck on the surface of the surface layer (B) of the stretched films of the thermoplastic resin, fully pressed, and then peeled off using a tension tester (product name "Autograph", product of Shimadzu Corporation) at a velocity of 1,000 mm/min. Surface conditions of the films from which the tape was peeled off were judged according to the criteria below:

⊚: no change observed;

○: practically of no problem despite a slight fluffing observed on the surface;

Δ: practically undesirable with a lot of fluffing on the surface; and

X: practically of no use with peeling within the film layer observed.

(5) Water Contact Angle on the Back Layer (C)

Contact angle of ion-exchanged water on the back layer (C) of the stretched films of the thermoplastic resin was measured using a contact angle gauge Model CA-D (product of Kyowa Kaimen Kagaku K.K.).

(6) Glue Drying Property on the Back Layer (C)

Starch-base glue (product of Tokiwa Kagaku K.K.) was coated on the back layer (C) of the stretched films of the thermoplastic resin using a rod bar in a solid amount of 5 g/m², and time periods until changes in the gloss of the coated glue occur were measured.

(7) Glue Adhesiveness on the Back Layer (C)

An adhesive tape (product name "Cellotape", product of Nichiban Co., Ltd.) was stuck on the surface on which the starch-base glue had already been coated and dried as described in (6), fully pressed, and then peeled off at a constant velocity and a constant angle of 90° with respect to the adhesive plane. Status of glue removal was visually checked and evaluated according to the criteria below:

⊚: cohesive failure of the glue observed;

○: destruction of the film portion observed;

Δ: practically undesirable with a partial glue removal from the back layer (C) while resistance during the tape peeling sensible; and X: practically of no use with removal of entire portion of the glue but without sensible resistance during the peeling.

Results of the individual tests were listed in Table 5. The table also contains difference between the melting point of the thermoplastic resin contained in the surface layer (B) and the stretching temperature (temperature difference X), and difference between the melting points of the base layer (A) and the surface layer (B) (temperature difference Y).

tion is most versatile in building decorative material and a wide variety of other applications.

What is claimed is:

1. A stretched film of a thermoplastic resin, comprising:

(A) a stretched film base layer containing 40 to 85 wt % of a thermoplastic resin and 60 to 15 wt % of a first inorganic fine powder or a first organic fine powder; and (B) a stretched film surface layer which is provided on at least one surface of said stretched film base layer and which contains 30 to 90 wt % of a thermoplastic resin and 70 to 10 wt % of a second inorganic fine powder or a second organic fine powder having an average particle size smaller than that of the first inorganic fine powder or the first organic fine powder contained in the stretched film base layer;

(C) a back layer comprising 30 to 70 wt % of a thermoplastic resin and 70 to 30 wt % of a third inorganic fine powder having a surface finished by hydrophilic treatment or a third organic fine powder having a surface finished by hydrophilic treatment;

wherein said back layer is provided on the surface of the stretched film base layer opposite to the stretched film surface layer;

wherein said stretched film of said thermoplastic resin has a porosity of 5 to 60%;

TABLE 5

| | Characteristics | | | | | | | | |
|---|---|---|---|---|---|---|---|---|---|
| | Temperature difference (° C.) | | Processability in embossing | | Surface layer (B) | | | Back layer (C) | |
| | | | | | | | Water | Glue drying | Glue |
| | X | Y | Process-ability | Relaxation Resistance | Ink adhe-siveness | Surface Hardness | contact angle | property (min) | adhe-siveness |
| Example 7 | 12 | 27 | ○ | ⊚ | ○ | ○ | 55 | 5 | ⊚ |
| Example 8 | 11 | 19 | ○ | ⊚ | ⊚ | ⊚ | 35 | 3 | ○ |
| Example 9 | 8 | 37 | ○ | ○ | ⊚ | ⊚ | 20 | 2 | ○ |
| Example 10 | 17 | 27 | ○ | ○ | ⊚ | ⊚ | 65 | 7 | ⊚ |
| Example 11 | 7 | 19 | Δ | ⊚ | ○ | ○ | 30 | 3 | ○ |
| Comparative Example 4 | 4 | 0 | X | Δ | ○ | ○ | 85 | 15 | Δ |
| Comparative Example 5 | — | 27 | X | Δ | Δ | ⊚ | 90 | 30< | X |
| Comparative Example 6 | 7 | 27 | ⊚ | X | Δ | Δ | 15 | 2 | ○ |

(note)
temperature difference X = [melting point of a thermoplastic resin in the surface layer (B)] − [stretching temperature]
temperature difference X = [melting point of a thermoplastic resin in the base layer (A)] − [melting point of a thermoplastic resin in the surface layer (B)]

Industrial Applicability

The stretched film of a thermoplastic resin of the present invention is excellent in all properties of processability in embossing, emboss relaxation resistance, ink adhesiveness on the surface layer (B) and surface hardness. For the case that the back layer (C) is provided, the stretched film is also quite excellent in water contact angle on such back layer (C), glue drying property and glue adhesiveness. Thus the stretched film of a thermoplastic resin of the present invenwherein said porosity is expressed by formula (1)

$$\frac{\rho_0 - \rho_1}{\rho_0} \times 100 \qquad (1)$$

wherein $\rho_0$ is a true density of the stretched film of the thermoplastic resin;

wherein said true density is almost equal to a density of the film before stretching; and wherein $\rho_1$ is a density of the stretched film of the thermoplastic resin.

2. The stretched film of the thermoplastic resin as claimed in claim 1, wherein said first inorganic fine powder or said first organic fine powder contained in the stretched film base layer has an average particle size of 0.6 to 3 μm; and wherein the second inorganic fine powder or the second organic fine powder contained in the stretched film surface layer has an average particle size of 0.1 to 2 μm.

3. The stretched film of the thermoplastic resin as claimed in claim 1, wherein the third inorganic fine powder or the third organic fine powder contained in the back layer has an average particle size of 0.6 to 3 μm.

4. The stretched film of the thermoplastic resin as claimed in claim 1, wherein the porosity of each of the layers A)–C) satisfies the following relation:

porosity of the stretched film surface layer<porosity of the stretched film base layer<porosity of the back layer;

wherein the porosity of each layer is expressed by formula (1)

$$\frac{\rho_0 - \rho_1}{\rho_0} \times 100 \qquad (1)$$

wherein $\rho_0$ is the true density of one of the layers A)–C);

wherein said true density is almost equal to a density of the film before stretching; and wherein $\rho_1$ is the density of said one layer of the layers A)–C) which is stretched.

5. The stretched film of the thermoplastic resin as claimed in claim 1, wherein any one of the thermoplastic resins is a mixture of a thermoplastic non-elastomer and a thermoplastic elastomer.

6. The stretched film of the thermoplastic resin as claimed in claim 1, wherein any one of the thermoplastic resins is a polyolefin-base resin, an olefin-base thermoplastic elastomer, or a mixture thereof.

7. The stretched film of the thermoplastic resin as claimed in claim 6, wherein the mixture of said polyolefin-base resin and said olefin-base thermoplastic elastomer contains 5 to 100 weight parts of the olefin-base thermoplastic elastomer per 100 weight parts of the polyolefin-base resin.

8. The stretched film of the thermoplastic resin as claimed in claim 1, wherein the melting point of thermoplastic resin contained in the stretched film surface layer is 10° C. or more lower than the melting point of the thermoplastic resin contained in the stretched film base layer.

9. The stretched film of the thermoplastic resin as claimed in claim 1, wherein the stretched film surface layer is embossed.

10. The stretched film of the thermoplastic resin as claimed in claim 1, wherein the back layer has a contact angle to water of 10 to 80°.

11. A building decorative material, comprising:

the stretched film of the thermoplastic resin as claimed in claim 1.

12. A method for producing the stretched film of the thermoplastic resin as claimed in claim 1, comprising:

i) stacking at least one film base layer and at least one film surface layer, to obtain a stack;

wherein said film base layer contains 40 to 85 wt % of a thermoplastic resin and 60 to 15 wt % of a first inorganic fine powder or a first organic fine powder; and wherein said film surface layer contains 30 to 90 wt % of a thermoplastic resin and 70 to 10 wt % of a second inorganic fine powder or a second organic fine powder having an average particle size smaller than that of the first inorganic fine powder or the first organic fine powder contained in the film base layer; and ii) stretching the stack.

13. The method as claimed in claim 12, further comprising:

forming a back layer containing 30 to 70 wt % of a thermoplastic resin and 70 to 30 wt % of a third inorganic fine powder or a third organic fine powder.

14. The method for producing the stretched film of a thermoplastic resin as claimed in claim 12, further comprising:

stretching the film base layer in advance of the stacking.

15. The method as claimed in claim 12, wherein the melting point of the thermoplastic resin contained in the film surface layer is 10° C. or more lower than the melting point of the thermoplastic resin contained in the film base layer.

16. The method as claimed in claim 12, wherein the stretching is effected at a temperature which is 5° C. or more lower than the melting point of the thermoplastic resin contained in the film surface layer.

17. The method as claimed in claim 12, wherein said stretching is uniaxial stretching.

* * * * *